United States Patent [19]

Waddington

[11] 4,098,147

[45] Jul. 4, 1978

[54] WADDINGTON DRIVE HAVING A CAM ACTUATED BY AN INTEGRAL FLYWEIGHT

[75] Inventor: Clive Waddington, Stratford, Conn.

[73] Assignee: Avco Corporation, Stratford, Conn.

[21] Appl. No.: 737,632

[22] Filed: Nov. 1, 1976

[51] Int. Cl.² .............................................. F16H 3/44
[52] U.S. Cl. ................................................. 74/750 B
[58] Field of Search .................. 74/750 B, 781 B, 117, 74/570, 571, 804

[56] References Cited

U.S. PATENT DOCUMENTS

| | | | |
|---|---|---|---|
| 3,803,931 | 4/1974 | Bianchini et al. | 74/117 |
| 3,848,474 | 11/1974 | Epstein | 74/117 |
| 3,874,253 | 4/1975 | Waddington | 74/750 B X |

*Primary Examiner*—Samuel Scott
*Assistant Examiner*—Frank H. McKenzie, Jr.
*Attorney, Agent, or Firm*—Ralph D. Gelling

[57] ABSTRACT

An improved Waddington drive, employed here as a bicycle wheel hub, provides an automatically shifting transmission driven by an operator's foot pedal crank. A number of planet gears journaled for rotation in the hub engage and revolve around a fixed sungear on a mounting shaft thereby carrying and rotating the hub with them. The planet gears are connected through one-way clutches to cranks whose arms follow a cylindrical cam, the eccentricity of which is variable as a function of speed and torque. The cam is pivotally mounted from the rotating input shaft and its eccentricity is controlled by the reaction force between the cam and its followers, the centrifugal force on the cam, and a restoring force developed by a cantilever spring urging the cam to return to an initial eccentricity selectable to match the operator's capabilities. The centrifugal control force is developed by a flyweight integral with the cam and by a counterweight serving to dynamically balance the input shaft.

11 Claims, 8 Drawing Figures

4,098,147

WADDINGTON DRIVE HAVING A CAM ACTUATED BY AN INTEGRAL FLYWEIGHT

BACKGROUND OF THE INVENTION

This invention is an improved automatic transmission of the type described in U.S. Pat. Nos. 3,803,932 and 3,874,253 issued to Clive Waddington and known as a Waddington drive.

A Waddington drive comprises a rotatable input element having a cam which can assume varying eccentricities. The cam reciprocates a series of followers on crank arms connected to output gearing through one-way clutches. The cam eccentricity determines the displacement of the followers during a revolution and thereby sets the drive's speed and torque ratios. A control system is provided which automatically changes the speed and torque ratios so that the drive can be incorporated into a vehicle hub such as a bicycle for use as an automatic transmission.

It is an object of the present invention to provide a mechanically simpler Waddington drive than those described in the aforementioned issued patents. A further object is to provide a more compact drive more particularly adaptable to a bicycle.

SUMMARY OF THE INVENTION

The invention comprises a stepless variable stroke drive with at least one rotatable output element and a rotatable input element having a generally cylindrical, eccentric cam pivoted therefrom. The cam reciprocates a series of followers on crank arms each connected by a one-way clutch to at least one planet gear journaled for rotation in the output element. The cam eccentricity determines the displacement of the followers and varies the drive's speed and torque ratios. The planet gear engages a fixed sungear so that rotation of the planet gear by the one-way clutch causes the planet gear to orbit about the fixed sungear and carry along the output element. To control the cam eccentricity, an automatic control system is provided which is responsive to the torque across the drive, to the input speed, and to the deviation of the drive from a selectable initial torque ratio. To compensate for the varying input torque and speed occurring during each revolution of operator-manipulated pedals, there are provided a damping means for adjusting sensitivity of the drive to input torque and speed and an inertial means to smooth out the input speed variation.

DETAILED DESCRIPTION OF THE INVENTION

Figure 1:
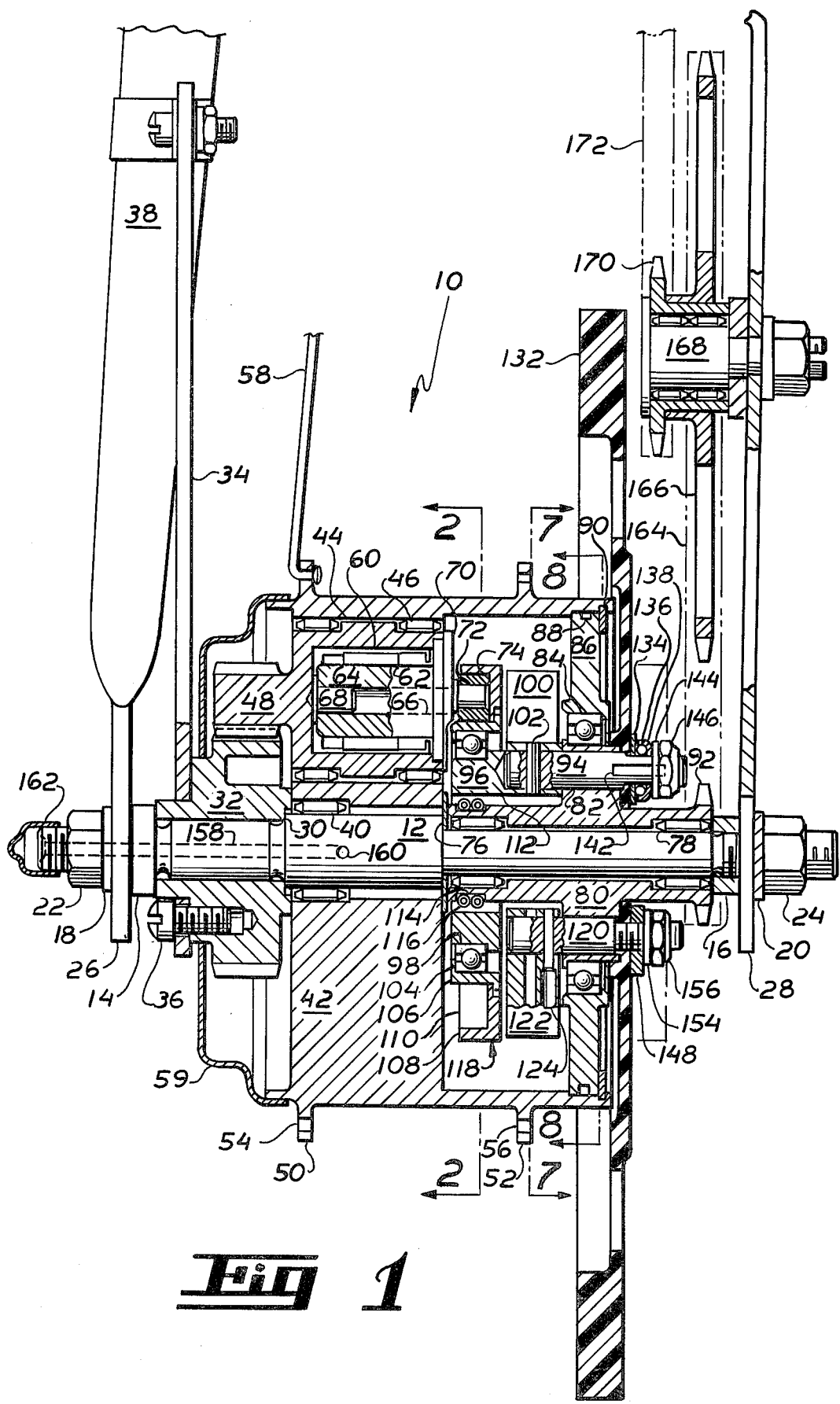
FIG. 1 is a top view, partly in section, of a stepless, variable-stroke, Waddington drive embodying the present invention and installed in the hub of a pedal-powered vehicle.

Illustrated in FIG. 1 is a drive 10 embodying the invention in a bicycle wheel hub to be driven by crank pedals manipulated by an operator. The drive may be used equally well in other types of operator-driven devices, such as hoists, winches, etc., or in motor driven devices such as motorcycles and snowmobiles.

The drive 10 has a central support shaft 12 on which nuts 14 and 16 are screwed to suitably retain the intervening parts. The drive 10 is removably secured in a bicycle (not shown) by washers 18 and 20 and nuts 22 and 24 which respectively clamp bicycle forks 26 and 28 against the nuts 14 and 16. Telescoped over and clamped between nut 14 and a shoulder 30 on support shaft 12 is a sungear 32. To prevent rotation of the sungear 32, one end of an arm 34 is fastened to it by a screw 36, while the other end is secured to a bicycle frame member 38. A hub 42 journaled over the support shaft 12 by bearings 40, has five longitudinal bores 44 in each of which are bearings 46 for journaling each of five pinions 48. The number of pinions used depends on the requirements of a particular application. The pinions 48 mesh with the sungear 32 so that rotating a pinion 48 about its center causes it to revolve about the fixed sungear 32 carrying hub 42 with it, this causing hub 42 to rotate about support shaft 12.

The outer periphery of the hub 42 has a pair of integral flanges 50 and 52 with holes 54 and 56 for receiving the spokes 58 of a wheel mounted in the usual fashion on the hub 42. Fitted over the left end of the outer periphery of the hub 42 and extending radially inward to the sungear 32 is a cup shaped shield 59 for the left side of the drive 10.

Each pinion 48 has a partial bore 60 containing an annular one-way clutch 62 journaling a crank 64. A clutch suitable for this purpose is available from the Torrington Bearing Company, Torrington, Ct. Catalogue No. RCB-101416-FS. Crank 64 has a central bore 66 in one end of which is thrust a plug 68 to limit movement of the crank 64 into bore 60. Flange 70 which has an eccentrically located pin 72 on which is journaled a roller 74 provides an integral crank arm for crank 64.

Telescoped over the central support shaft 12 and abutting the hub 42 is a spacing washer 76. Next to the washer 76, journaled by bearings 78 on the central support shaft 12, is a rotatable input shaft 80 which has, somewhat removed from either end, a concentric integral flange 82. Journaled by bearings 84 on the cylindrical periphery of the flange 82 is an annular cover plate 86 which supports the hub 42 and is sealed thereto by an O-ring 88. A snap ring 90 holds the cover plate 86 in position against the hub 42. On the end of the input shaft 80 which protrudes from the drive 10 is an integral sprocket 92 for imparting rotation.

Figure 2:
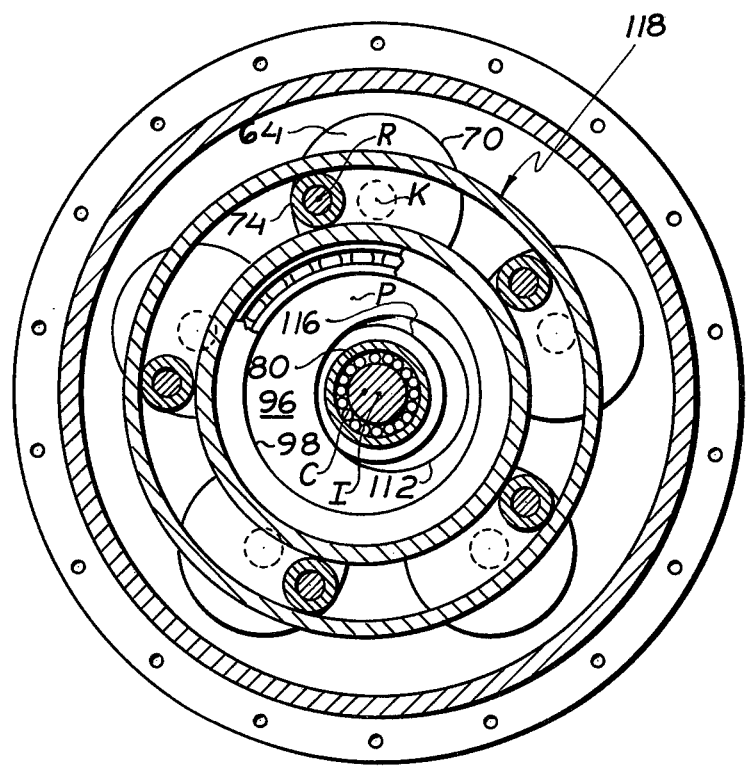
FIG. 2 is a cross-sectional view of the drive of FIG. 1 taken on line 2—2 of FIG. 1.
Figure 3:
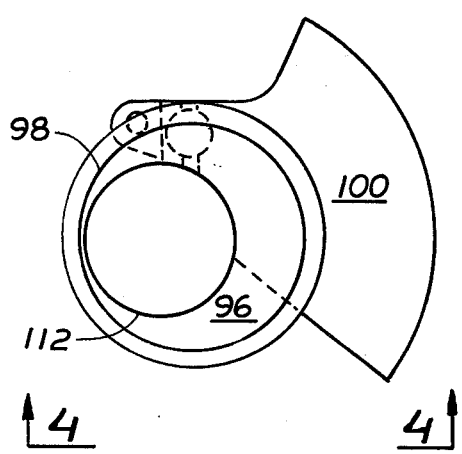
FIG. 3 is a view of one of the parts shown in FIG. 1, namely the cam disc and its integral flyweight.
Figure 4:
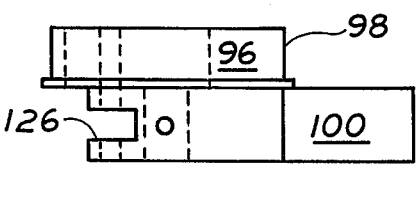
FIG. 4 is a view of FIG. 3 taken on line 4—4 of FIG. 3.

A pivot axis removed from the axis of rotation of the input shaft 80 is provided by journaling a pivot pin 94 in the flange 82. A cam disc 96 having a generally cylindrical outer surface 98 and a relatively massive integral flyweight 100 extending radially outward is mounted on the pin 94 with the geometric center of the cylindrical surface 98 spaced from the axis of the pin 94. FIGS. 3 and 4 show the cam disc 96 removed from the drive 10. The cam disc 96 is fixed against rotation relative to the pivot pin 94 by cross pin 102 as shown in FIG. 1. Journaled over the cylindrical outer surface 98 by bearings 104 is an inner flanged ring 106. An outer flanged ring 108 mates with the inner ring 106 forming an annular channel 110 within which the rollers 72 ride. As may best be seen in FIGS. 2 and 3, the disc 96 has a circular aperture 112 eccentric to its cylindrical outer surface 98. Extending into this aperture 112 as shown in FIG. 1, is an end of the input shaft 80 which has a concentric groove 114 retaining two elastomeric O-rings 116 telescoped thereon.

The disc 96, the flyweight 100, the bearings 104 and the annular channel 110 comprise a cam 118 which pivots about the pin 94 varying its eccentricity relative to the axis of rotation of the input shaft 80. The pivoting motion is stopped when the periphery of the aperture 112 in the cam disc 96 contacts the input shaft 80. The two O-rings 116 cushion the motion of the cam 118 as it reaches the limits of its travel. In FIG. 2 the cam 118 is shown at the limit of its counterclockwise travel, which is its least eccentric position.

During operation of the drive 10 as viewed in FIG. 2, the input shaft 80 and the cam 118 mounted thereon rotate clockwise, and the crank rollers 74, in following the eccentric motion of the cam 118, are sequentially displaced toward and then away from the geometric center of the cam 118. The displacement of the rollers 74 causes each crank arm 70 to be pivotally reciprocated. Thus each crank 64 is sequentially driven to a maximum angular velocity clockwise and then counterclockwise. The one-way clutches 62, however, allow each crank 64 to engage its pinion 48 only when rotated clockwise under load. Thus each of the cranks engages its pinion 48 and transmits torque only when its clockwise angular velocity exceeds that of the other cranks. This occurs sequentially for each crank when it is near and at its maximum clockwise angular velocity. Since all of the pinions 48 mesh with the fixed sungear 32 and are contained within the hub 42, the instantaneously driven pinion orbits around the fixed sungear carrying the hub and the other pinions with it. The clockwise angular velocity of these other pinions, i.e., the pinions being carried by the hub, is greater than that of their respective cranks so that their clutches are unengaged during this interval. The sequential driving rotation of the pinions causes substantially uniform rotation of the hub at an angular velocity approximately corresponding to the maximum angular velocity of the pinions. Characteristic of a Waddington drive, increased eccentricity of the cam increases the displacement of the rollers during a revolution. A correspondingly higher angular velocity is then imparted to the cranks and to the hub thereby increasing the output to input speed ratio of the drive and decreasing its output to input torque ratio.

Control of this embodiment of a Waddington drive is accomplished in part by the flyweight 100 which offsets the center of mass of the entire cam 118 from both the cam pivot pin 94 and the axis of rotation of the input shaft 80. As a result, rotation of the input shaft 80 produces a centrifugal torque urging the cam 118 to pivot about its pivot pin 94 toward a more eccentric position, which is counterclockwise as viewed in FIG. 7. Counterclockwise pivoting of the cam 118 in response to the centrifugal torque swings the flyweight 100 away from the axis of rotation of the input shaft 80 increasing the centrifugal force and consequently the centrifugal torque on the cam 116.

Figure 5:
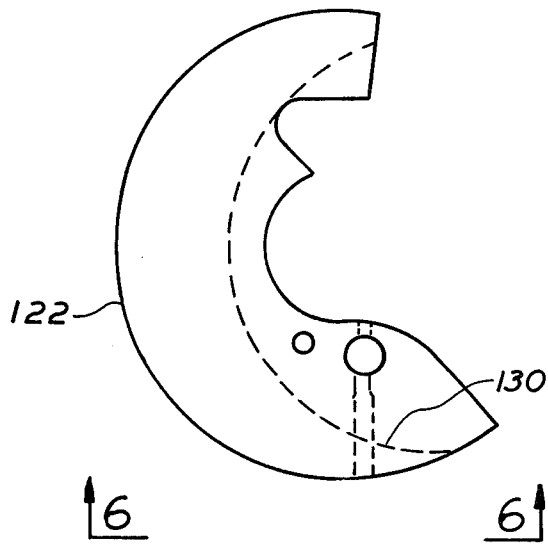
FIG. 5 is a view of another of the parts shown in FIG. 1, namely the counterweight.
Figure 6:
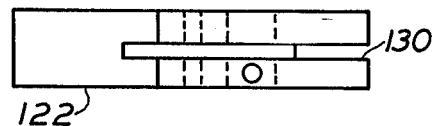
FIG. 6 is a view of FIG. 5 taken on line 5—5 of FIG. 5.

Journaled in the disc 82, diametrically opposite the cam pivot pin 94 and equidistant from the axis of the input shaft 80, is another pivot pin 120 to which a counterweight 122 is fixed by a cross pin 124. FIGS. 5 and 6 show the counterweight 122 removed from the drive 10. The mass of the counterweight 122 equals that of the cam 118, and the centers of mass of these two bodies lie equally spaced from the axes of their respective pivot pins 94 and 120 in a single plane normal to the axis of the input shaft 80.

Figure 7:
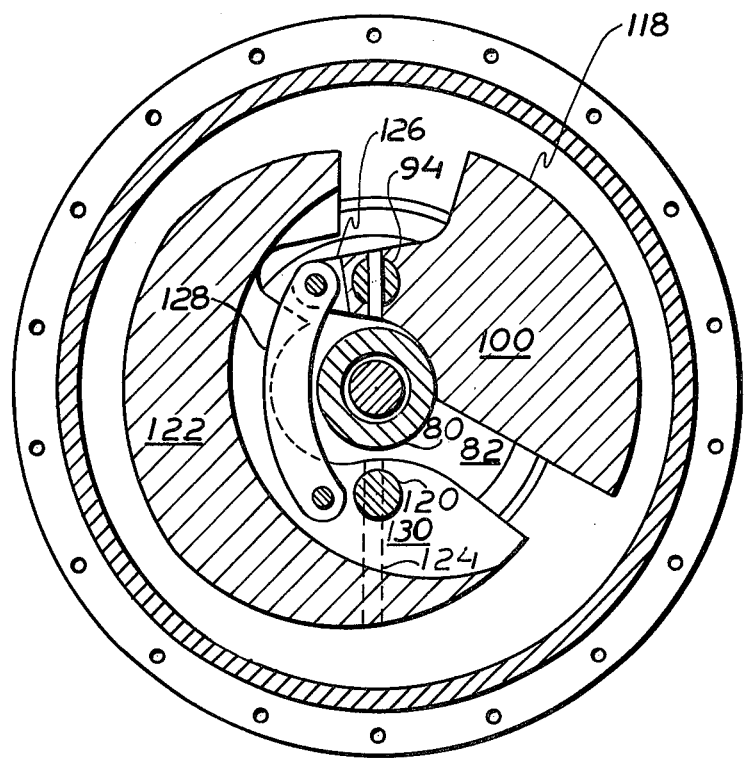
FIG. 7 is a cross-sectional view of the drive of FIG. 1 taken on line 7—7 of FIG. 1.

To provide dynamic balancing, the cam 118 and counterweight 122 are connected by rigid link 128, best seen in FIG. 7, so that their centers of mass remain diametrically opposite each other and equidistant from the axis of the input shaft 80 for all eccentricities of the cam. For this purpose, the flyweight 100 has a slot 126 within which one end of link 128 is pivotally mounted at some distance from the cam pivot pin 94. In an identical angular and spatial relationship to the cam pivot pin 94, the other end of the link 128 is pivotally mounted in a slot 130 in the counterweight 122. The link 128 incidentally transmits the centrifugal torque generated by the counterweight 122 to the cam 118 allowing a less massive flyweight 100 to be used to generate a desired torque about the cam pivot pin 94.

Figure 8:
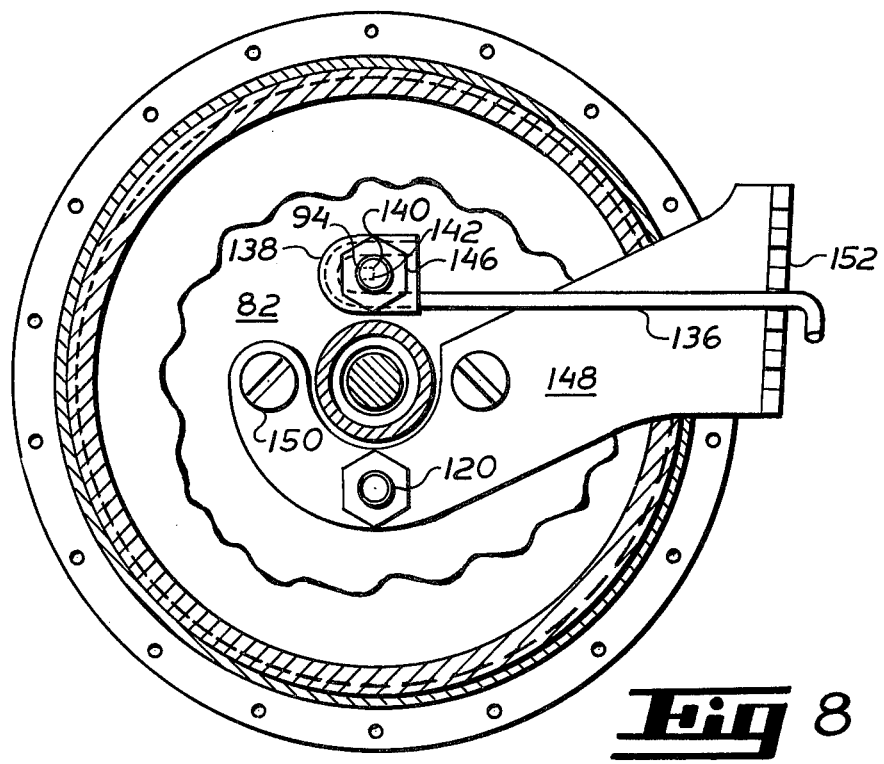
FIG. 8 is an end view of the drive of FIG. 1 taken on line 8—8.

As seen in FIG. 1, an inertia wheel 132 is mounted on the input shaft 80 over the outside ends of the pivot pins 94 and 120. Adjacent to the inertia wheel 132, telescoped over the pin 94 is a flat washer 134 followed by the hook end of a circular wire, cantilever spring 136, best seen in FIG. 8. A clip 138 which has a tang 140 received by a slot 142 in pin 94 prevents rotation of the hook end of the spring 136 relative to the pin 94. Returning to FIG. 1, telescoped over pin 94 following the clip 138 is a helical spring lockwasher 144 and a self locking nut 146. As also show in FIG. 8, a spring adjusting bracket 148 is mounted on the input shaft disc 82 by pin 120 and screws 150. The bracket 148 has a portion bent at a right angle in which is a series of notches 152 for variably positioning and retaining the free end of the spring 136.

Telescoped over pivot pin 120, adjacent to the bracket 148 is another helical spring lockwasher 154 and a self locking nut 156. To damp the pivoting movement of the cam 118 relative to the input shaft 80, for reasons explained later, self-locking nuts 146 and 156 are torqued against lockwashers 144 and 154 until a suitable friction force produced by the flyweight 100 and counterweight 122 rubbing against the input shaft flange 82 is developed.

The left end of the central support shaft 12 has an axial central bore 158 leading to a diametric bore 160 opening into the interior of the drive 10 for introducing oil into the drive 10. The inlet to the axial bore 158 is sealed by a cap 162 fitting over the left end of the shaft 12.

The input shaft sprocket 92, which is of small diameter, is rotatively driven by a chain 164, shown by phantom lines in FIG. 1. The chain 164 is driven by a large sprocket 166 fixed on a lay shaft 168. Also on the lay shaft 168 is a small sprocket 170 which is driven by a second chain 172. The second chain 172 is itself driven by a large sprocket (not shown) which is turned by a crank manipulated by an operator's feet. Thus a large step-up in speed is provided from the foot driven crank to the input shaft 80. This allows a sizeable centrifugal torque to be developed on the cam 118 with relatively light masses and small torque arms for the cam 118 and its counterweight 122. In addition, the high input speed reduces the torque transmitted through the input and intermediate elements of the drive 10, in particular the one-way clutches 62, allowing them to be smaller and lighter.

As explained earlier, in a Waddington drive the output to input ratios of speed and torque are varied by varying the eccentricity of the cam. In accordance with this invention, the initial eccentricity is selectable in advance by the operator to bias the drive to suit his capabilities. Subsequently, in operation, automatic control of the drive's ratio is provided by three torques acting on the cam to adjust its eccentricity. The cam assumes a position which balances the three torques acting on it. The initial eccentricity adjustment is made by the operator's placing the free end of the spring in an appropriate notch of the spring adjusting plate. Thereafter, the spring when deflected in either direction as the cam eccentricity is changed, provides a restoring control torque urging the cam back to its initial eccentricity.

The second control torque is the centrifugal torque generated by the cam and its integral flyweight which urges the cam toward greater eccentricity as an increasing function of the input shaft speed thereby providing sensitivity to the input speed.

The third control torque arises from the inherent sensitivity of a Waddington drive to the torque being developed across the drive. The load on the drive, here the resistance of the bicycle wheel, is reflected into the crank rollers as a resistance to reciprocation. Thus as the cam pushes upon the crank rollers, the rollers exert equal and opposite reaction forces upon the cam. The mean reaction force of the rollers upon the cam produces a torque around the cam pivot pin urging the cam toward lower eccentricity.

The geometric relationships involved with the reaction force are elucidated with reference to FIG. 2. When the cam 118, in clockwise rotation, pushses on a crank 64 so that the line connecting the center K of the crank 64 and the center of rotation I of the input shaft 80 is approximately normal to the line connecting the center of rotation I of the input shaft 80 and the center of curvature C of the cam 118, the cam 118 is then driving that particular crank 64 to approximately its maximum clockwise angular velocity. Consequently, the one-way clutch 62 around that crank 64 is engaged and is driving its pinion 48. The reaction force exerted by the corresponding roller 74 upon the cam 118 acts through the center of curvature R of the roller 74 and the center of curvature C of the cam 118. The cam pivot point P is located to give the reaction force a moment arm around the pivot point P to produce a torque urging the cam 118 toward lower eccentricity.

The control torques acting upon the cam cause the drive to automatically adjust its torque ratio to meet varying output demands. For instance, as the bicycle begins to climb a hill, the output torque demand increases and the reaction force on the cam increases. If the cyclist continues to pedal at the same speed, the increased reaction force urges the cam toward lower eccentricity until the increased reaction torque is balanced by the change in spring torque. With the lower cam eccentricity, the output speed has decreased and the drive's output to input torque ratio has increased thereby allowing the cyclist to continue to pedal at the same input torque he had been using. Thus if the initial eccentricity selection had been made to match the cyclist's pedaling speed and input torque capabilities, i.e., his optimum power developing capability, the drive will automatically adjust to meet varying output torque requirements while the cyclist pedals at his selected input speed and torque.

If the cyclist while progressing up the hill wearies and reduces the effort applied to the pedals, the bicycle will slow up causing the cyclist to also reduce his pedaling speed. The lower torque across the drive reduces the reaction torque on the cam moderately, while the lower input speed reduces the centrifugal torque on the cam to a greater extent. Accordingly, the cam assumes a lower eccentricity where the drive's output to input torque ratio is greater allowing the cyclist to meet the output torque requirement with a lower input torque. The bicycle, of course, will travel at a slower speed, not only because the cyclist is pedaling slower, but also because the drive's output to input speed ratio has been reduced.

It should now be apparent that at a given pedaling speed, the drive will allow the cyclist to maintain a constant input torque while the drive's torque ratio varies to meet changing output demand. At a higher pedaling speed, the drive will require that the cyclist maintain a gear input torque while the drive's torque ratio varies to meet changing output demand. Measurements made on cyclists indicate that for each power level a cyclist desires to expend, the cyclist has an optimum pedaling speed which is an increasing function of the desired power level. The drive's responsiveness to the pedaling speed provided by its centrifugal control mechanism allows the cyclist to pedal at approximately optimum speed over a range of power level.

The inertia of a bicycle and its mounted cyclist tends to make the bicycle wheel, here the output element, run at a constant speed. However, the pedal torque and pedal speed typically developed by a cyclist vary considerably during a pedal revolution. The sensitivity of the drive to these variables would cause rapid cyclic fluctuations in the drive's ratios. To avoid this, cyclic fluctuations in input are smoothed by an ertia wheel 132. In addition, by suitably torquing the lock nuts 146 and 156, the friction force on the flyweight 100 and the counterweight 122 produced by their rubbing against the input shaft flange 82 damps the drive's sensitivity to input speed and torque and also helps prevent cyclic shifting in response to the cyclic pedal inputs.

While the preferred embodiment of the present invention has been described, it should be apparent to those skilled in the art that the invention may be provided in forms other than shown here without departing from the spirit and scope thereof.

Having thus described the invention, what is claimed as novel and desired to be secured by Letters Patent of the United States is:

1. In a stepless variable stroke drive, the combination of:
   an input shaft journaled for rotation on its axis and being constructed with a radially extending flange;
   a cam having a cylindrical disc mounted with its axis parallel to the axis of said shaft; said cam disc having an aperture through which said input shaft projects, said aperture permitting pivotal motion of said cam about said axis of said input shaft;
   a driving connection between said cam and said input shaft, said connection comprising a pivot pin eccentrically fixed in said cam and journaled in said flange, thereby permitting the radial displacement of said disc to positions of varying eccentricity relative to the axis of the shaft;

means for yieldingly biasing said cam to a given initial eccentricity;

a relatively massive flyweight integral with said disc and extending radially therefrom for urging said disc toward greater eccentricity with a torque varying as a function of the rotational speed of said input shaft;

crank means having at one end a follower engagable with said cam for pivoting cyclic movement of said follower, the length of movement of said follower being proportional to the eccentricity of said cam whereby the speed and torque ratios of said drive are varied;

an output element journaled for rotation;

means for transmitting the rotational motion of said crank means to said output element;

a counterweight having a driving connection between said counterweight and said input shaft, said connection permitting the radial displacement of said counterweight from the axis of said input shaft; and linking means between said cam and said counterweight, said counterweight, said driving connection, and said linking means cooperating to maintain said input shaft in dynamic balance.

2. The invention as in claim 1 wherein said driving connection between said counterweight and said input shaft comprises a pivot pin fixed in said counterweight and journaled in said flange.

3. The invention as in claim 2 wherein said linking means comprises a fixed link having its ends respectively pivoted on sid cam disc and on said counterweight so that the centers of mass of said cam and said counterweight are maintained diametrically opposite each other and in equal displacement from said input shaft axis.

4. The invention as in claim 3 further comprising means for adjustably damping the displacement of said cam relative to said input shaft whereby variations in said drive's input-output ratios in response to rapid cyclic changes of input torque are damped.

5. The invention as in claim 4 wherein said adjustable damping means comprises:

said flyweight being fixed on said cam pivot pin with a radial face adjacent to a radial face of said input shaft flange;

said cam pivot pin having an end extending through said input shaft flange;

a spring lock washer telescoped over said cam pivot pin end;

threads on said cam pivot pin end; and a self-locking nut screwed on said threads compressing said lock washer against said flange so that said flyweight rubs against said flange providing a frictional damping force when said cam is displaced relative to said input shaft.

6. The invention as in claim 4 wherein said adjustable damping means comprises:

said counterweight being fixed on said counterweight pivot pin with a radial face adjacent to a radial face of said input shaft flange;

said counterweight pivot pin having an end extending through said input shaft flange;

a spring lock washer telescoped over said counterweight pivot pin end;

threads on said counterweight pivot pin end, and a self-locking nut screwed on said threads compressing said lock washer against said flange so that said counterweight rubs against said flange providing a frictional damping force when said cam is displaced relative to said input shaft.

7. The invention as in claim 3 wherein said means for initially biasing said cam comprises:

a spring cantilevered from said cam holder pivot pin for yieldingly restraining rotation of said pin; and a bracket fixed to said input shaft, said bracket having a plurality of notches for variable angular positioning of the free end of said spring.

8. The invention as in claim 3 wherein said means for transmitting rotational motion comprises:

at least one planet gear journaled for rotation in said output element;

a nonrotatable gear engaging said planet gear for providing a torque reaction therewith;

a one-way clutch connecting said crank means to said planet thereby causing said planet to revolve about the rotational axis of said output element at an input-output speed ratio generally proportional to the eccentricity of said cam.

9. The invention as in claim 3 further comprising a layer of elastomeric material around said input shaft extending within said aperture of said cam disc for cushioning the rotational motion of said cam at the limits of its motion.

10. The invention as in claim 3 wherein said input element includes an inertia wheel fixed thereto.

11. The invention as in claim 3 wherein:

said cam disc has an annular channel journaled thereon;

said follower comprises a roller journaled to said crank means and riding within said annular channel whereby movement of said cam means pivots said follower.

* * * * *